Patented Mar. 9, 1937

2,073,207

UNITED STATES PATENT OFFICE 2,073,207

MANUFACTURE OF ASCORBIC ACID AND ITS ANALOGUES

Walter Norman Haworth, Edmund Langley Hirst, John Kenyon Netherton Jones, and Fred Smith, Edgbaston, Birmingham, England, assignors to The British Drug Houses, Limited, London, England, a company of Great Britain No Drawing. Application August 28, 1935, Serial No. 38,324. In Great Britain September 1, 1934

10 Claims. (Cl. 260—123)

This invention relates to the manufacture of 2-keto-acids of the sugar series and their esters and to the manufacture therefrom of ascorbic acid and its analogues.

The main object of the invention is to enable the latter compounds to be prepared by a simplified synthesis from sugars or sugar derivatives.

According to the invention the 2-keto-acids are produced directly by oxidation of the corresponding ketose sugar or derivative thereof.

The process can be effected by subjecting a ketose sugar or derivative thereof to oxidation by heating with aqueous nitric acid as such, or the nitric acid may be produced in the reaction as for example with a mixture of a nitrate and a suitable acid as, for example, barium nitrate and aqueous sulphuric acid. A suitable oxidation catalyst may be present, if desired. The control of the oxidation is important, and in this connection it will be understood that the period of the oxidation will vary with the quantity and strength of the acid used and the temperature at which the oxidation is carried out.

At the desired moment the oxidation reaction is suitably interrupted by rapid cooling, dilution if necessary and neutralization with a weak alkali, for example barium carbonate.

The heating is preferably effected on a boiling water bath so that in respect of a particular sugar to be oxidized the factors to be considered are the strength of the acid and the period of heating. The concentration of the acid must not be so high that the oxidation of the sugar will be carried too far, or that it would be unduly difficult to control the oxidation process. Accordingly it is preferable to have such a dilution of the acid that the desired degree of oxidation is produced in a period of some minutes. The examples given below disclose suitable conditions for the particular cases concerned therein. In other cases it may be necessary to perform trial tests to determine the appropriate conditions as to strength of acid and period of heating.

The organic acids produced by the oxidation, after a process of thorough purification and working up, are preferably esterified and the esters of the 2-keto-acids may be isolated from the esterification mixture after concentration if necessary. These products and also the syrupy mother liquors can then be used for conversion into ascorbic acid or its analogues or alternatively the esterification mixture can be used without isolation of the esters.

The conversion into ascorbic acid or its analogues can be effected (see Ohle, Zeitschrift für Angewandte Chemie 1933, 46, 399 and Maurer and Schiedt, Ber. 1933, 66, 1054) by treating an alcoholic solution of the esterification product or esterfication mixture with an enolizing agent, e. g. an alkali alkoxide such as sodium methoxide, and boiling the mixture and acidifying with alcoholic hydrogen chloride. The reaction products are then purified.

The properties of the synthetic analogues of ascorbic acid so obtained very closely resemble those of ascorbic acid itself. They readily undergo oxidation with aqueous iodine and have the reducing properties and colour reactions associated with ascorbic acid itself.

The following examples illustrate the invention:—

Example 1

Sorbitol is converted into laevo-sorbose (yield 60-65%) by the action of B-xylinum in the manner disclosed by Bertrand (Comp. Rend. 1904. 139, 985). The crystalline sorbose (5 g.) is dissolved in 10 cc. water, heated to 90-95° C. on a boiling water bath and 10 cc. nitric acid (Sp. Gr. 1.4) added. The mixture is heated on the boiling water bath for 4 minutes and cooled rapidly by pouring into 40 cc. ice water and the solution neutralized with a weak alkali such as barium carbonate. The solution is clarified, by filtration or centrifuging, and concentrated under diminished pressure to a thin syrup. Any inorganic salt which has separated during the concentration is removed by filtration, and the syrup poured into a large volume of methyl alcohol or other suitable solvent. The precipitated salts are separated as for example by filtration or by centrifugal means. (The precipitate may be re-extracted with methyl alcohol or other suitable solvent and again filtered or centrifuged.) It is then extracted with water and any insoluble material removed from the solution obtained. (The aqueous salt solution may be further purified by concentration under diminished pressure, filtration, precipitation in methyl alcohol or other suitable solvent, separation of the precipitate by filtration or by centrifugal means, extraction with water and removal of insoluble material.)

The organic acids are completely liberated by acidification with sulphuric, hydrochloric or other suitable acid. After removal of the insoluble salt by suitable means as, for example, by centrifuging, the aqueous solution is concentrated under reduced pressure. To the syrupy residue methyl alcohol or other suitable alcohol either alone or in conjunction with another suitable solvent is added, and the volatile liquid removed under reduced pressure. This procedure simultaneously removes water and esterifies, and is repeated two or more times till the syrup is anhydrous.

Alternatively the process may be carried out as a continuous treatment with suitable vapour till all the water has been removed. Any inorganic salt precipitated during the process is filtered off.

The esterification of the organic acids is completed either by the continuous distillation, or by the repeated removal of methyl alcohol alone or other alcohol either alone or in conjunction with another suitable solvent at ordinary pressure.

The resulting syrup containing in the case of the oxidation of laevo-sorbose and esterification with methyl alcohol, methyl-2-keto-laevo-gulonate is dissolved in dry methyl alcohol (20 cc.) and a solution of sodium methoxide in methyl alcohol (1.5 cc. containing 0.54 g. sodium methoxide) added. The mixture is boiled and acidified with alcoholic hydrogen chloride.

Yield of laevo-ascorbic acid by iodometric titration=0.9 g.

The filtered alcoholic solution is concentrated in vacuo in the absence of oxygen to a syrup which is extracted with absolute ethyl alcohol or other suitable solvent and the extract filtered.

The resulting solution is purified by solvent treatment and concentrated under reduced pressure in the absence of oxygen to a syrup which is left to crystallize. The crystalline laevo-ascorbic acid is isolated from the syrup by solvent treatment.

Yield of laevo-ascorbic acid (M. P. 192°, $$[\alpha]_D^{18°} = +49°$$

in methyl alcohol (c. 0.9))=0.5 g.

The syrupy mother liquors, from which a further quantity may be obtained, may either be purified by further treatment with solvents or by suitable methods such as precipitation with neutral or basic lead acetate. (J. C. S. 1933, 1418 and J. C. S. 1934, 63.)

*Example 2*

Crystalline sorbose (5 g.) is oxidized in the same manner as in Example 1. The subsequent procedure is similar except that the esterification product is concentrated to a syrup and allowed to crystallize. The crystalline methyl-2-keto-laevo-gulonate (0.47 g., M. P. 156–157°, $$[\alpha]_D^{18°} = -28°$$

c=1 in methyl alcohol) is isloated by solvent treatment. The crystalline ester is dissolved in methyl alcohol and converted to laevo-ascorbic acid by treatment with the theoretical quantity of sodium methoxide in methyl alcoholic solution. After boiling for 1 minute in a nitrogen atmosphere the solution is cooled and rendered slightly acid with methyl alcoholic hydrogen chloride. After filtration the solution is evaporated to a syrup which is extracted with acetone or ethyl alcohol and purified with solvents if necessary. On concentration of the filtered solution pure laevo-ascorbic acid separates. (0.47 g. methyl 2-keto-gulonate gave 0.30 g., M. P. 190–192° C.)

The syrupy mother liquors from the isolation of the crystalline methyl ester are esterified for a further period and treated with sodium methoxide and alcoholic hydrogen chloride and subsequently purified in a similar manner to Example 1. In this way a further quantity of laevo-ascorbic acid is obtained.

*Example 3*

Fructose (10 g.) is oxidized by heating with aqueous nitric acid (40 cc. containing 20 cc. Sp. Gr. 1.4 nitric acid) on a boiling water bath for 5 mins. The procedure thereafter is exactly similar to that described in Example 2. The syrupy ester crystallizes spontaneously and gives 2.0 g. pure methyl-2-keto-dextro-gluconate, M. P. 174° C.

$$[\alpha]_D^{20°} = -78°$$

in water (equilibrium value c. 1.0). The latter substance is converted into 3-keto-dextro-glucono-lactone by similar treatment to that described in Example 2.

On concentration of the purified solution 3-keto-dextro-glucono-lactone separates. Yield= 1.3 g. from 2.0 g. methyl-2-keto-dextro-gluconate, M. P. 168° C.

$$[\alpha]_D^{19°} = -20°$$

in water (c. 10). (100 mg. required 11.4 cc. N/10 iodine in acid solution. Calc. 11.4 cc.).

After separation of the crystalline material from the syrupy ester, some methyl-2-keto-dextro-gluconate remains in solution in the syrup. This is converted into 3-keto-dextro-glucono-lactone by the same method as for laevo-ascorbic acid. From 10 g. of fructose a further 0.3 g. 3-keto-dextro-glucono-lactone is obtainable in this way, the total yield of product being therefore 1.6 g. from 10 g. fructose.

What we claim is:—

1. Process for the manufacture of 2-keto-acids of the sugar series for conversion into ascorbic acid and its analogues, in which a ketose is heated with aqueous nitric acid and the reaction is interrupted when the oxidation of the ketose has reached the stage of the production of the corresponding 2-keto-acid.

2. Process as claimed in claim 1 in which the temperature of the heating and the quantity and strength of the acid are correlated, so that the desired stage of oxidation is reached in a short period of time.

3. Process for the manufacture of 2-keto-acids of the sugar series for conversion into ascorbic acid and its analogues, in which a ketose is heated with aqueous nitric acid, and the reaction is interrupted by rapid cooling and neutralization with a weak alkali when the oxidation of the ketose has reached the stage of the production of the corresponding 2-keto-acid.

4. Process for the manufacture of 2-keto-acids of the sugar series for conversion into ascorbic acid and its analogues, in which a ketose is heated with aqueous nitric acid, and the reaction is interrupted by rapid cooling, dilution, and neutralization with a weak alkali, when the oxidation of the ketose has reached the stage of the production of the corresponding 2-keto-acid.

5. Process as claimed in claim 3 in which after the interruption of the reaction, the reaction mass is worked up by operations comprising neutralization, clarification, precipitation of the aqueous salt solution by organic solvents to precipitate the organic salts, clarification, extraction of the separated solids with water, and liberation of the 2-keto-acid by acidification.

6. Process for the manufacture of 2-keto-acids of the sugar series for conversion into ascorbic acid and its analogues, in which a ketose is heated, at a temperature approximating that of boiling water, with nitric acid diluted with water to a specific gravity in the neighborhood of 1.2, and the reaction is interrupted after a period of time less than ten minutes.

7. Process for the manufacture of 2-keto-laevo-gulonic acid for conversion into laevo-ascorbic acid, in which laevo-sorbose is heated for a period of time less than thirty minutes and at a temperature at or near the boiling point of water, with aqueous nitric acid.

8. Process for the manufacture of 2-keto-laevo-gulonic acid for conversion into laevo-ascorbic acid, in which laevo-sorbose is heated, at a temperature at or near the boiling point of water, with nitric acid diluted with water to a specific gravity in the neighborhood of 1.2, and the reaction is interrupted after a period of time of several minutes.

9. Process for the manufacture of 2-keto-laevo-gulonic acid for conversion into laevo-ascorbic acid, in which laevo-sorbose is heated at a temperature at or near the boiling point of water with nitric acid diluted with water to a specific gravity in the neighborhood of 1.2, the reaction is interrupted after a period of time of several minutes, by rapid cooling, dilution, and neutralization with a weak alkali, and then the reaction mass is worked up by operations comprising clarification, precipitation of the aqueous salt solution by organic solvents to precipitate the organic salts, clarification, extraction of the separated solids with water and liberation of the 2-keto-acid by acidification.

10. Process for the manufacture of a member of the group consisting of ascorbic acid and its analogues, which comprises oxidizing a ketose to form an oxidation product including the corresponding 2-keto-acid, working up and purifying said oxidation product to a concentrate including the 2-keto-acid, esterifying said concentrate to form an esterified product including an ester of the 2-keto-acid, and subjecting said esterified product to treatment with an enolizing agent without segregating said esterified 2-keto-acid.

WALTER NORMAN HAWORTH.
EDMUND LANGLEY HIRST.
JOHN KENYON NETHERTON JONES.
FRED SMITH.